United States Patent
Roller et al.

(10) Patent No.: US 6,653,789 B2
(45) Date of Patent: Nov. 25, 2003

(54) MULTIREGULATOR CIRCUIT AND LAMP

(75) Inventors: Philip C. Roller, Ashville, NY (US);
Timothy A. DiPenti, Russell, PA (US);
Paul J. Kahanic, Jr., Ashville, NY (US)

(73) Assignee: Truck-Lite Co., Inc., Falconer, NY (US)

( * ) Notice: Subject to any disclaimer, the term of this patent is extended or adjusted under 35 U.S.C. 154(b) by 0 days.

(21) Appl. No.: 09/816,050

(22) Filed: Mar. 22, 2001

(65) Prior Publication Data

US 2003/0006717 A1 Jan. 9, 2003

(51) Int. Cl.[7] .................................................. B60Q 1/26
(52) U.S. Cl. ......................... 315/80; 315/291; 315/299
(58) Field of Search ......................... 315/80, 291, 299, 315/300, 301, 307, 77, 200 R; 362/800; 307/10.8, 10.1

(56) References Cited

U.S. PATENT DOCUMENTS

| | | | |
|---|---|---|---|
| 3,771,043 A | 11/1973 | Zulaski | 320/39 |
| 4,199,714 A | 4/1980 | Marum | 323/4 |
| 4,739,226 A | 4/1988 | Murata | 315/224 |
| 4,903,011 A | 2/1990 | Reinholm et al. | 340/641 |
| 4,994,954 A * | 2/1991 | Katz et al. | 323/271 |
| 5,347,224 A | 9/1994 | Brokaw | 324/522 |
| 5,528,474 A | 6/1996 | Roney et al. | 362/249 |
| 5,663,875 A | 9/1997 | Cassese et al. | 363/95 |
| 5,765,940 A | 6/1998 | Levy et al. | 362/240 |
| 5,942,883 A | 8/1999 | Preis et al. | 323/282 |
| 6,150,774 A * | 11/2000 | Mueller et al. | 315/291 |
| 6,166,496 A * | 12/2000 | Lys et al. | 315/292 |
| 6,175,200 B1 | 1/2001 | Kern | 315/307 |
| 6,239,555 B1 * | 5/2001 | Rachwal | 315/200 R |

FOREIGN PATENT DOCUMENTS

FR          0406143 A1     1/1991   ..................... 33/8

* cited by examiner

*Primary Examiner*—Don Wong
*Assistant Examiner*—Thuy Vinh Tran
(74) *Attorney, Agent, or Firm*—The Bilicki Law Firm, P.C.

(57) ABSTRACT

This invention relates to circuits for operation over a range of voltages, more particularly for a vehicle lamp circuit that provides lighting over a range of voltages. The invention provides a circuit that allows the operation of an LED array lamp over a range of voltage. This is achieved by making use of three-terminal adjustable regulators. One of the three-terminal regulators is configured as a voltage regulator. It regulates the voltage by a connection to a voltage divider. A second three-terminal regulator is connected to the voltage regulator. The second regulator is configured to be a current regulator with the current set by one resistor. This circuit can be further modified with additional adjustable three-terminal regulators to increase in functionality.

39 Claims, 3 Drawing Sheets

MULTIREGULATOR CIRCUIT AND LAMP

FIELD OF INVENTION

This invention relates to circuits for operation over a range of voltages, more particularly for a vehicle lamp circuit that provides lighting over a range of voltages.

BRIEF DESCRIPTION OF THE DRAWINGS

Other aspects, objects, and advantages of the present invention appear more clearly on reading the following best mode for carrying out the invention, given by way of example and made with reference to the accompanying drawings, in which.

DETAILED DESCRIPTION OF THE DRAWINGS

Figure 1:
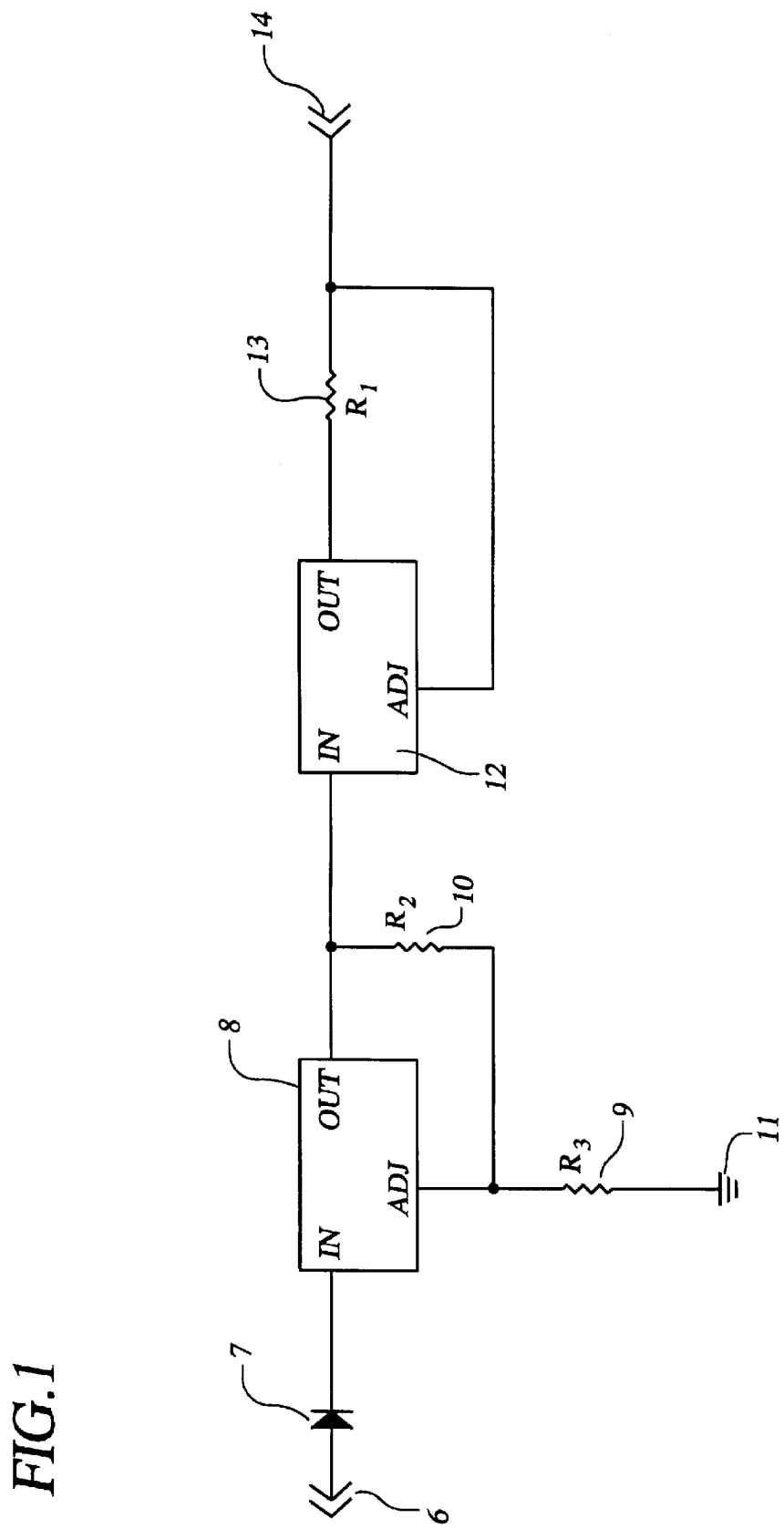
FIG. 1 shows a schematic of the circuit to operate a marker lamp over a range of voltages.

For the purpose of promoting an understanding of the present invention, reference will be made to embodiments of a multivoltage circuit, as well as embodiments of a marker and a clearance/tail/stop lamp, as illustrated in the drawings. However, it should be understood that these embodiments are not presented to represent a limitation on the invention. Other vehicle lamps and other electronic components could provide additional embodiments which would fall within the spirit and scope of the invention described herein. Referring now to the drawings in detail, for the ease of the reader, like reference numerals designate identical or similar parts throughout the drawings.

FIG. 1 illustrates a multiregulator circuit that can operate over a wide range of operating voltages. In particular, the circuit shown in FIG. 1 is an embodiment of a dual regulator circuit that can be used to power a marker lamp for vehicles. As will be discussed in more detail hereinbelow, in this embodiment, the operating voltage of the circuit is approximately 10 to 50 volts.

As shown in FIG. 1, input voltage is applied to line 6 through diode rectifier 7 to the IN terminal of adjustable three-terminal regulator 8. Adjustable three-terminal regulator 8 is configured as a voltage regulator. Specifically, regulator 8 is connected to two resistors 9 and 10 that act as voltage dividers. As mentioned above, in the embodiment shown here, the input voltage of the circuit is approximately 10 to 50 volts. However, the circuit can operate at higher voltages provided the voltage drop from input to output of the individual adjustable threeterminal regulators does not exceed 40 volts. If necessary, the use of larger or more efficient heat sinks can manage any increased heat generated by higher voltages and larger voltage drops.

In the embodiment described herein, regulator 8 is regulated at approximately 18 volts by resistors 9 and 10. One of ordinary skill in the art will readily appreciate that regulator 8 can be regulated at a variety of voltages by selecting different values for resistors 9 and 10.

Thus, the example used herein is not meant to limit the embodiments of the invention to an 18-volt voltage regulator. Adjustable three-terminal regulators, such as an LM317T manufactured by National Semiconductor, can serve as voltage regulator 8 described herein. One of ordinary skill in the art will readily appreciate, however, that, in addition to the LM317T regulator, other types and models of three-terminal adjustable regulators can be used in alternate embodiments of the instant invention. The output from voltage regulator 8 is applied to a second adjustable three-terminal regulator 12, which is configured to be a current regulator. Resistor 13 in series with regulator 12 sets the output current of current regulator 12. In the embodiment shown in FIG. 1, the output of current regulator 12 is then applied to light source 14. Light source 14 can be an incandescent bulb, a single light emitting diode, an array of light emitting diodes or a plurality of light emitting diode arrays.

In the embodiment disclosed herein, current regulator 12 is set to approximately 50 mA by resistor 13. However, one of ordinary skill in the art will readily appreciate that current regulator 12 can be regulated at a variety of currents by selecting different values for resistor 13. Thus, the example used herein is not meant to limit the embodiments of the invention to a 50-mA current regulator. Adjustable three-terminal regulators, such as an LM317LZ manufactured by National Semiconductor, can serve as current regulator 12 described herein. One of ordinary skill in the art will readily appreciate, however, that, in addition to the LM317LZ regulator, other types and models of three-terminal adjustable regulators can be used in alternate embodiments of the instant invention.

The dual regulator circuit illustrated in FIG. 1 allows lamps, or other electrical devices, to operate over a wide range of input voltages. In one embodiment, a lamp, such as a vehicle marker lamp, which incorporates the dual regulator circuit of FIG. 1, can operate over an approximate range of 10 to 50 volts. The lamp comprises light source 14, as well as a housing (not shown), a lens cover (not shown), and a circuit board (not shown) comprising input and output lines connecting the lamp to the circuit shown in FIG. 1. In one embodiment of such a lamp, the housing can be removably secured to a vehicle. Moreover, as mentioned above, light source 14 can be an incandescent bulb, a single light emitting diode, an array of light emitting diodes or a plurality of light emitting diode arrays. In an alternate embodiment, potting material (not shown), such as an epoxy, may be used to hold light source 14 and the circuit board in place, as well as to seal the lamp from water and environmental damage.

At voltages below 20 volts, voltage regulator 8 passes the input voltage through with losses. Provided there is enough voltage to drive light source 14 and current regulator 12, the current through light source 14 will be limited to the amount dictated by the value of resistor 13. At higher voltages, voltage regulator 8 limits the voltage applied to current regulator 12 to the voltage determined by resistors 9 and 10. In some cases a heat sink (not shown) is required for voltage regulator 8. The heat sink can be made of any material capable of adequately dissipating the heat generated at the maximum operating voltage under the most severe operating conditions. In one embodiment, the heat sink is made of zinc. In another embodiment, the heat sink is made of aluminum. In one embodiment, the heat sink is located between the lens cover and the circuit board with the light emitting diode(s) attached to it. When the heat sink is disposed in this way, portions of the heat sink will be cut to define a hole(s) to allow light to pass through. In an alternate embodiment, the heat sink is placed under the circuit board.

Figure 2:
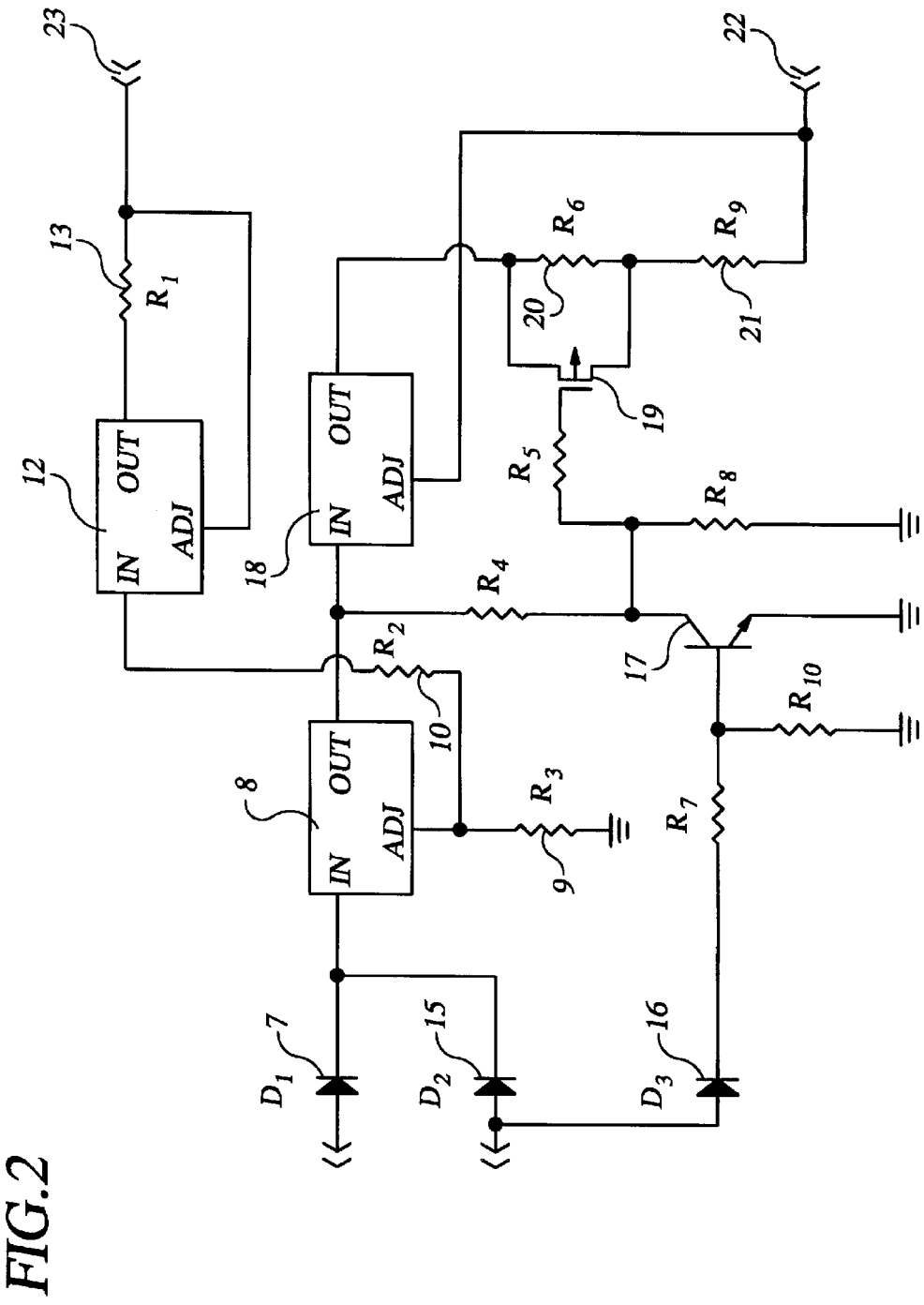
FIG. 2 shows a schematic of the circuit with additional components to operate a clearance, stop/tail lamp.

FIG. 2 illustrates another embodiment of a multiregulator circuit with additional components that can operate over a wide range of input voltages. In this embodiment, the multiregulator circuit can be used to power a stop/tail/clearance lamp for vehicles. The circuit shown in FIG. 2 is similar to the circuit in FIG. 1. However, the circuit in FIG. 2 comprises additional circuitry to produce a controlled change in the resistance of an additional circuit, thereby providing a varying current. In the embodiment described herein, the varying current provides the increase or decrease of light intensities that is required for the stop/tail lamp function.

With respect to the clearance function of a combined stop/tail/clearance lamp, the circuit in FIG. 2 is similar to the circuit in FIG. 1. Specifically, adjustable three-terminal regulator 8 is configured as a voltage regulator, wherein resistors 9 and 10 regulate the output voltage. Then, current passes from voltage regulator 8 through a second adjustable three-terminal regulator 12, which is configured to be a current regulator. Current regulator 12 then supplies a constant current to light source 23. Similar to the circuit illustrated in FIG. 1, the circuit shown in FIG. 2 comprises resistor 13, which sets the current in current regulator 12. The current through light source 23 will be limited to the amount dictated by the value of resistor 13. Changing the value of resistor 13 changes the values set for current regulator 12.

As with light source 14, light source 23 can be an incandescent bulb, a single light emitting diode, an array of light emitting diodes or a plurality of light emitting diode arrays. For example, in one embodiment, light source 23 is the center light emitting diode array of a vehicular stop/tail/clearance lamp. The center light emitting diode array is composed of a single light emitting diode and performs the clearance lamp function, wherein the clearance function of the lamp utilizes a constant current. In this embodiment, the current requirement for the center light emitting diode is approximately 35 mA to 50 mA, depending on the type of light emitting diode used. One of ordinary skill in the art will readily appreciate that advances in light emitting diode technology may allow lower current requirements that may modify the embodiments described herein while remaining within the scope and spirit of the present invention. In addition, other lamps or electrical devices that operate more efficiently with a constant current can utilize the circuit described hereinabove.

The multiregulator circuit shown in FIG. 2 also provides power for the stop/tail function of the combined stop/tail/clearance lamp. In the circuit shown in FIG. 2, the tail lamp voltages are applied through diode rectifier 7 and the stop lamp voltages are applied through diode rectifier 15. The tail and stop lamp voltages are combined at the input of voltage regulator 8, so that the circuit becomes active if either a stop lamp or a tail lamp voltage is applied. Current passes from voltage regulator 8 to adjustable three-terminal regulator 18. Adjustable three-terminal regulator 18 is configured as a second current regulator to supply current to light source 22 for the stop/tail function. In one embodiment, the main light emitting diode array for the stop/tail functions of the lamp is composed of two series strings of three light emitting diodes. It should be understood, however, that changes in the configuration of the light emitting diode array, such as the use of a single light emitting diode, to produce stop/tail lamp functions are within the scope and spirit of this invention.

Diode rectifier 16 applies voltage to a transistor switch 17, such as a general purpose NPN transistor manufactured by numerous manufacturers, including National Semiconductor. Transistor switch 17 has a collector connected to the gate of P-channel MOSFET 19. In the embodiment shown here, MOSFET 19 is used to remove or add resistor 20 to the circuit by sensing voltage levels. A logic level version of MOSFET 19 can be used to assure that MOSFET 19 will turn on and off at the lower voltages, particularly voltages in a range of approximately 4 to 10 volts.

When transistor switch 17 is activated, MOSFET 19 is turned on, which shunts resistor 20 effectively removing it from the circuit. With resistor 20 removed from the current path, more current will travel to light source 22. When the circuit in FIG. 2 is used in a vehicular stop/tail lamp, engaging the stop lamp voltage turns activates transistor switch 17, which then turns on MOSFET 19. The increased amperage that results when MOSFET 19 shunts current around resistor 20 will cause the stop/tail lamp to shine more brightly for the stop lamp function.

Removing the stop lamp voltage turns off transistor switch 17, which allows the gate of MOSFET 19 to go high, thereby turning it off. When MOSFET 19 is turned off, the previously shunted resistor 20 is effectively added to the circuit. When both resistors 20 and 21 are utilized in series, the added resistance reduces the current to produce dimmer tail lamp illumination.

MOSFETs identical to or similar to part no. IRF-7204 manufactured by International Rectifier can serve as MOSFET 19 described in this embodiment of the instant invention. However, one skilled in the art will readily appreciate that other MOSFETs manufactured by other manufacturers could be used. Moreover, it should be understood that the use of MOSFET 19 is intended as an example only and other electrical components that perform substantially the same function could be used.

It should be recognized that the instant invention is not limited to the embodiments shown in FIGS. 1 and 2. Additional adjustable three-terminal regulators, each combined with appropriate resistors, may be added in series to the circuits shown in FIGS. 1 and 2 to reduce voltage input in a step down process. The additional adjustable three-terminal regulators may be configured as either voltage regulators or current regulators.

Figure 3:
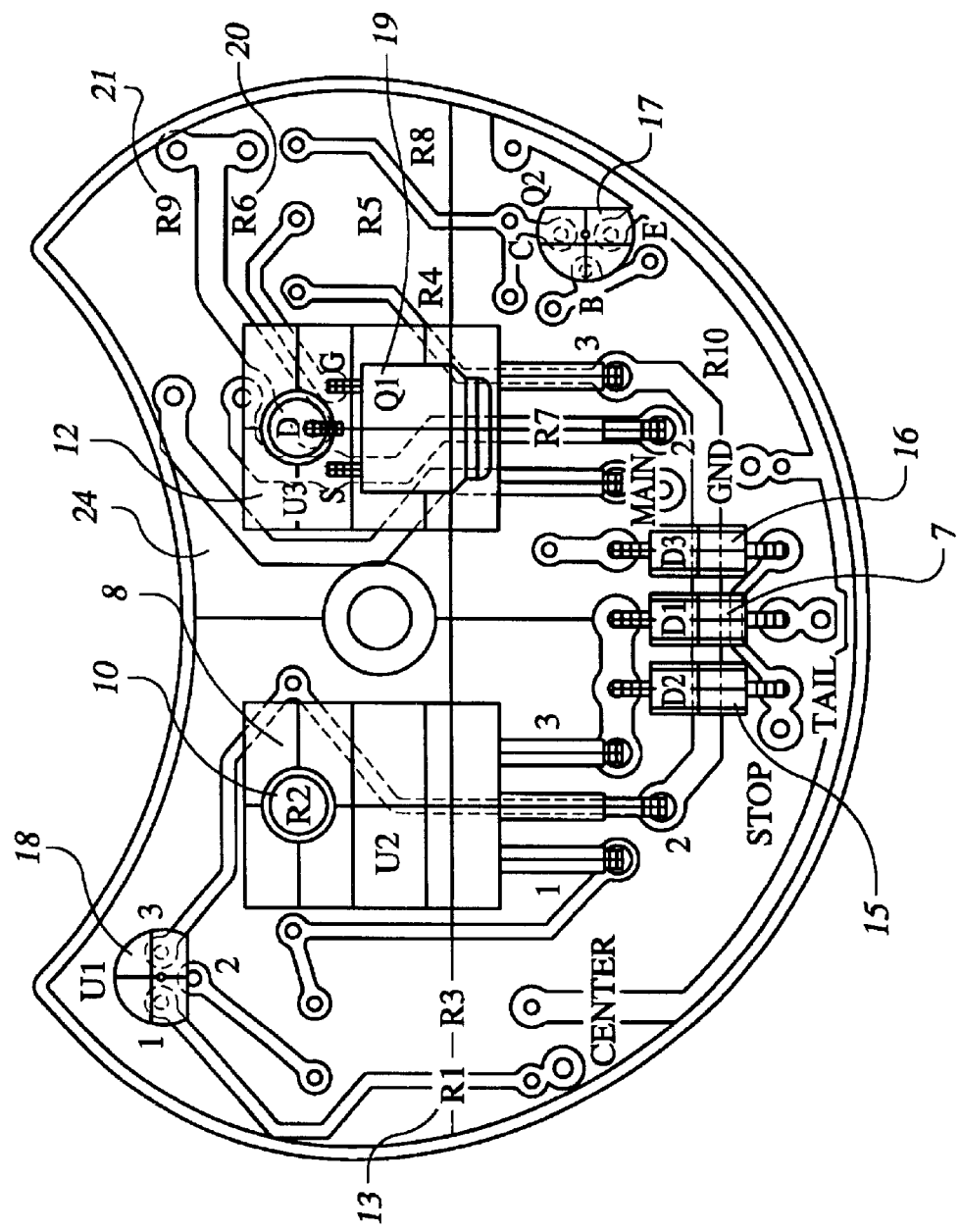
FIG. 3 shows a front view of a lamp with the incorporated circuit.

FIG. 3 shows the circuit of FIG. 2 on circuit board 24 for a vehicle lamp. One of ordinary skill in the art will readily appreciate that the simplicity of the multiregulator circuit disclosed herein allows for a slim design for a vehicular marker or stop/tail/clearance lamp or other lamp.

Although, for convenience, embodiments of the present invention have been described herein, it will be apparent to those skilled in the art that many variations of this invention can be made without departing from the spirit of the invention as claimed.

What is claimed is:

1. A lamp comprising:

a housing adapted to be removably secured to a vehicle;

a lens cover;

potting material;

a heat sink; and, a light source comprising at least one light emitting diode attached to a circuit board, said circuit board containing a circuit for controlling current over an input voltage range, said circuit comprising:

a diode rectifier which receives said input voltage, said diode rectifier connected in series with a first of at least one adjustable three-terminal regulator;

said first of at least one adjustable three-terminal regulator configured as a voltage regulator for voltage regulation, said voltage regulation provided by a first and second resistor working as voltage divider;

said first of at least one adjustable three-terminal regulator connected in series to a second of at least one adjustable three-terminal regulator; and, said second of at least one adjustable three terminal regulator configured as a current regulator for current regulation, said current regulation provided by a third resistor with said resistor regulating current output value.

2. A lamp according to claim 1 wherein said heat sink is located over said circuit board and below said lens cover, wherein portions of said heat sink define at least one hole to allow light from said light source to pass through said heat sink.

3. A lamp according to claim 1 wherein said heat sink is located under said circuit board.

4. A lamp according to claim 1 wherein said heat sink is zinc.

5. A lamp according to claim 1 wherein said heat sink is aluminum.

6. A lamp according to claim 1 wherein said light source is a single series string of three light emitting diodes.

7. A circuit for controlling current over a voltage range, comprising:

a plurality of diode rectifiers which receive input voltage, said diode rectifiers connected in series with a first of at least one adjustable three-terminal regulator;

said first of at least one adjustable three-terminal regulator configured as a voltage regulator for voltage regulation, said voltage regulation provided by a first and second resistor working as voltage divider;

said first of at least one adjustable three-terminal regulator connected in series to a second of at least one adjustable three-terminal regulator; and, said second of at least one adjustable three-terminal regulator configured as a first current regulator for current regulation, said current regulation provided by a third resistor setting current output value;

a third of at least one adjustable three-terminal regulator configured as a second current regulator for current regulation connected in series with said voltage regulator, said current regulation provided by a fourth resistor setting the current output value, a transistor switch connected to said plurality of diode rectifiers and operatively connected in series to a gate of a P-channel MOSFET; and, said P-channel MOSFET shunting a fifth resistor from said circuit when activated by current from said transistor switch, said fifth resistor connected in series with said fourth resistor.

8. A circuit according to claim 7 wherein said voltage range is 10 to 50 volts.

9. A circuit according to claim 7 wherein said at least one voltage regulator is set to 18 volts by said voltage dividers.

10. A circuit according to claim 7 wherein said first current regulator is set to 50 mA by said third resistor.

11. A circuit according to claim 7 wherein said second current regulator is set to 58 mA by said third resistor and the insertion of said fifth resistor by said MOSFET.

12. A circuit according to claim 7 wherein said second current regulator is set to 220 mA by said third resistor and the removal of said fifth resistor by said MOSFET.

13. A lamp comprising:

a housing adapted to be removably secured to a vehicle;

a lens cover;

a heat sink;

potting material; and, a light source comprising a combination of light emitting diode arrays attached to a circuit board, said circuit board containing a circuit for controlling current over an input voltage range, said circuit comprising:

a plurality of diode rectifiers which receive input voltage, said diode rectifiers connected in series with a first of at least one adjustable three-terminal regulator;

said first of at least one adjustable three-terminal regulator configured as a voltage regulator for voltage regulation, said voltage regulation provided by a first and second resistor working as voltage divider;

said first of at least one adjustable three-terminal regulator connected in series to a second of at least one adjustable three-terminal regulator; and, said second of at least one adjustable three-termninal regulator configured as a first current regulator for current regulation, said current regulation provided by a third resistor setting current output value;

a third of at least one adjustable three-terminal regulator configured as a second current regulator for current regulation connected in series with said voltage regulator, said current regulation provided by asfourth resistor setting current output value;

a transistor switch connected to said plurality of diode rectifiers and operatively connected in series to a gate of a P-channel MOSFET; and, said P-channel MOSFET shunting a fifth resistor from said circuit when activated by current from said transistor switch, said fifth resistor connected in series with said fourth resistor.

14. A lamp according to claim 13 wherein said heat sink is over said circuit board and below said lens cover, wherein portions of said heat sink define at least one hole to allow light from said light emitting diode array to pass through said heat sink.

15. A lamp according to claim 13 wherein said heat sink is under said circuit board.

16. A lamp according to claim 13 wherein said heat sink is zinc.

17. A lamp according to claim 13 wherein said heat sink is aluminum.

18. A lamp according to claim 13 wherein said light emitting diode arrays are a center array comprising a single light emitting diode and a main array comprising two series strings of three light emitting diodes.

19. A lamp according to claim 13 wherein said lamp functions as a stop/tail/clearance lamp.

20. A lamp comprising:

a housing;

at least one light source;

a lens adjacent to said at least one light source; and a circuit operatively connected to said at least one light source, said circuit comprising at least one diode rectifier, a plurality of adjustable three-terminal regulators, and a plurality of resistors, wherein one of said plurality of adjustable three-terminal regulators is configured as a first voltage regulator and one of said plurality of adjustable three-terminal regulators is configured as a first current regulator.

21. A lamp according to claim 20 wherein said circuit has an operating voltage of approximately 10 to 50 volts.

22. A lamp according to claim 20 wherein said first voltage regulator is operatively connected to a first and second of said plurality of resistors as voltage divider.

23. A lamp according to claim 22 wherein said first voltage regulator is regulated at approximately 18 volts by said voltage divider.

24. A lamp according to claim 22 wherein said first current regulator is operatively connected to a third of said plurality of resistors to regulate current output.

25. A lamp according to claim 24 wherein said current output of said first current regulator is approximately 50 mA.

26. A lamp according to any of claims 20–25 that functions as a vehicle marker lamp.

27. A lamp according to claim 24 further comprising one of said plurality of adjustable three-terminal regulators configured as a second current regulator, said second current regulator operatively connected to a fourth of said plurality of resistors to regulate current output.

28. A lamp according to claim 27 further comprising a fifth of said plurality of resistors operatively connected in series with said fourth resistor, and a transistor switch operatively connected to said at least one diode rectifier and operatively connected in series with a P-channel MOSFET.

29. A lamp according to claim 28 wherein said current output of said second current regulator is approximately 58 mA when said transistor switch is turned off and said P-channel MOSFET is deactivated.

30. A lamp according to claim 28 wherein said P-channel MOSFET is activated by current from said transistor switch and said P-channel MOSFET shunts said fifth resistor from said circuit.

31. A lamp according to claim 30 wherein said current output of said second current regulator is approximately 220 mA.

32. A lamp according to any of claims 27–31 that functions as a combined stop/tail/clearance lamp for vehicles.

33. A lamp according to claim 20 wherein said at least one light source comprises at least one light emitting diode.

34. A lamp according to claim 33 further comprising potting material for embedding said at least one light emitting diode and said circuit board.

35. A lamp according to claim 20 wherein said at least one light source comprises at least one series string of three light emitting diodes.

36. A lamp according to claim 35 further comprising potting material for embedding said at least one series string of three light emitting diodes and said circuit board.

37. A lamp according to claim 20 further comprising a heat sink for dissipating heat away from said at least one light source.

38. A lamp according to claim 37 wherein said heat sink is zinc.

39. A lamp according to claim 37 wherein said heat sink is aluminum.

\* \* \* \* \*